United States Patent [19]
Telford

[11] Patent Number: 4,775,040
[45] Date of Patent: Oct. 4, 1988

[54] MANUALLY-OPERATED AXIALLY-ENGAGING POSITIVE CLUTCH

[75] Inventor: Thomas M. Telford, Gladstone, Oreg.

[73] Assignee: Warn Industries, Inc., Milwaukie, Oreg.

[21] Appl. No.: 912,954

[22] Filed: Sep. 29, 1986

[51] Int. Cl.[4] .......................... F16D 11/00; F16D 1/06
[52] U.S. Cl. ................................ 192/67 R; 192/93 A; 192/94; 192/95; 403/1
[58] Field of Search ................... 192/94, 95, 97, 67 R, 192/93 A; 403/1

[56] References Cited

U.S. PATENT DOCUMENTS

| | | | |
|---|---|---|---|
| 3,442,361 | 5/1969 | Hegar | 192/95 X |
| 3,718,213 | 2/1973 | Hegar et al. | 192/95 X |
| 3,753,479 | 8/1973 | Williams | 192/95 X |
| 4,007,820 | 2/1977 | Kagata | 192/95 X |
| 4,266,646 | 5/1981 | Telford | 192/94 X |
| 4,365,696 | 12/1982 | Telford | 192/94 X |
| 4,696,382 | 9/1987 | Aho | 192/67 R |

Primary Examiner—Rodney H. Bonck
Attorney, Agent, or Firm—Robert L. Harrington

[57] ABSTRACT

A hub mechanism for four wheel drive vehicles. Movement of the clutch ring into and out of position for interengaging the pinion of the axle end and a housing portion of the wheel hub, is provided by a pair of opposed spring members. The first spring member provides continuous urging for disengagement. A second spring member is coupled to a camming mechanism that is activated by a manually operated dial. Turning the dial physically moves the second spring member relative to the clutch ring. In a retracted position the strong spring member is backed away from the clutch ring to permit disengagement. Opposite dial turning moves the strong spring member for urging engagement of the clutch ring with the pinion.

3 Claims, 2 Drawing Sheets

MANUALLY-OPERATED AXIALLY-ENGAGING POSITIVE CLUTCH

FIELD OF INVENTION

This invention relates to a clutch mechanism for four wheel drive vehicles and more particularly to an actuator assembly for inducing clutch engagement.

HISTORY OF INVENTION

A clutch mechanism of the present invention is comprised of a pinion that is fixed to the end of a driven axle. A housing surrounds the pinion and is affixed to the wheel hub. A clutch ring is axially slideable to a first position of interengagement with both the housing and pinion whereby the driven axle rotatably drives the pinion, through it the clutch ring and housing, and thereby the wheel. The clutch ring is axially slideable to a second position where it is out of engagement with one or the other of the pinion and housing to disengage the axle from the wheel.

The clutch ring is manually moved between the two positions by the turning of a dial positioned on the exterior of the hub. Turning the dial one way and then the other operates a camming mechanism that spring biases the clutch ring into and out of engagement.

The spring biasing force is generated for both engagement and disengagement of the clutch ring. This is provided by two springs, one urging disengagement and the other urging engagement. One of the springs is stronger and if unrestrained, will determine the position of the clutch ring. Thus the camming mechanism operated by the dial, functions to restrain the effect of the stronger spring and allow the weaker spring to urge the clutch ring into the opposite position. A clutch mechanism of the general type described is disclosed in U.S. Pat. No. 3,753,479 issued Aug. 21, 1973.

Whereas the clutch mechanism of the above U.S. Patent effectively actuates the clutch ring, there are some disadvantages in it. Turning the dial to a disengaged position, i.e., to constrain the strong spring, requires compression of the spring. The spring force generated by the strong spring is substantial. Thus turning the dial, designed for manual finger gripping and turning, can be difficult.

The camming mechanism for the strong spring includes a cam follower that abuts the spring and forces compression thereof. Each individual part adds complexity and cost and it is desirable to reduce the number of parts.

BRIEF SUMMARY OF THE INVENTION

The present invention improves on the '479 Patent by the provision of a cam mechanism whereby turning the dial to constrain the strong spring pressure is simply a matter of backing the strong spring away from the clutch ring. The opposite turning of the dial moves the spring against the resistance of the weaker spring, requiring a lesser finger turning force as compared to the device of the '479 Patent.

Also, this design enables one of the cam or follower components to be integrated into the strong spring or clutch ring element, reducing the number of parts.

DETAILED DESCRIPTION AND DRAWINGS

A preferred embodiment of the present invention will be described in detail, with reference to the drawings wherein.

Referring to FIGS. 1 through 5, a housing for the clutch mechanism illustrated is in two parts, referred to as a body portion 10 and cap 12.

Figure 1:
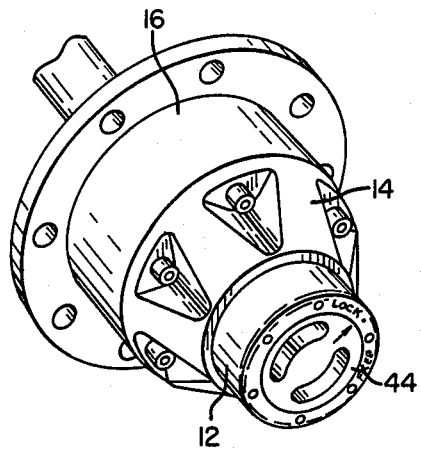
FIG. 1 is a perspective view of a clutch mechanism of the present invention incorporated into the wheel hub of a four wheel drive vehicle.
Figure 2:
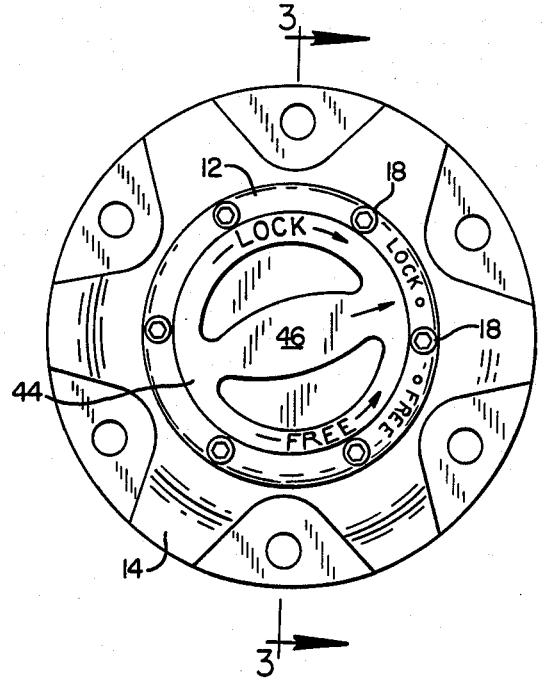
FIG. 2 is an front outside view of the clutch mechanism of FIG. 1.

For the purpose of aiding discussion, the cap end of the housing will sometimes be referred to as the axially directed outer end of the housing and the body portion as the axially directed inner end of the housing. The body portion 10 is nested in a casing 14 that is bolted to a wheel hub 16 (FIG. 1 only). The body portion 10 and cap 12 are secured together by screws 18, and the housing made up of these parts, is secured in the casing 14 by tabs 20 of the casing projected into detents 22 formed in the body portion 10.

A pinion 24 is rotatably mounted in the body member 10, inset from the inner walls of the body member so as to produce a circumferential spacing between the outer periphery of the pinion 24 and inner walls of the body member. This rotatable mounting is provided by an inner end flange 26 of the body member 10, and bearing members 28 and 30.

Splines 32 are formed on the inner wall of the body portion 10 and splines 34 are formed on the outer periphery of the pinion 24. Whereas the splines 32 extend substantially the length of the body portion 10, splines 34 are shorter in length to permit disengagement of the clutch ring 36 to be now explained.

Figure 3:
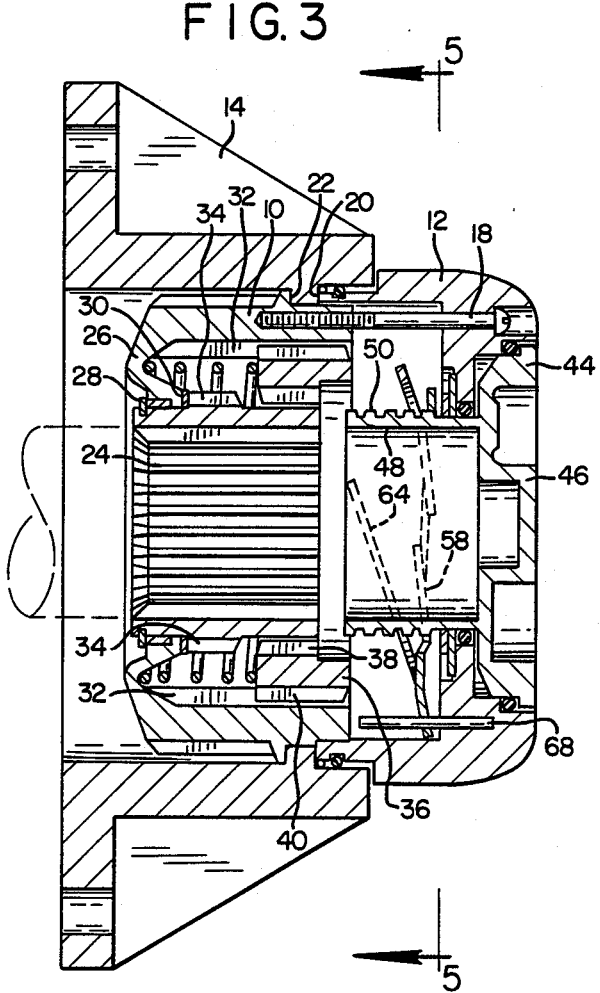
FIG. 3 is a section view as taken on view lines 3—3 of FIGS. 2 and 5.
Figure 4:
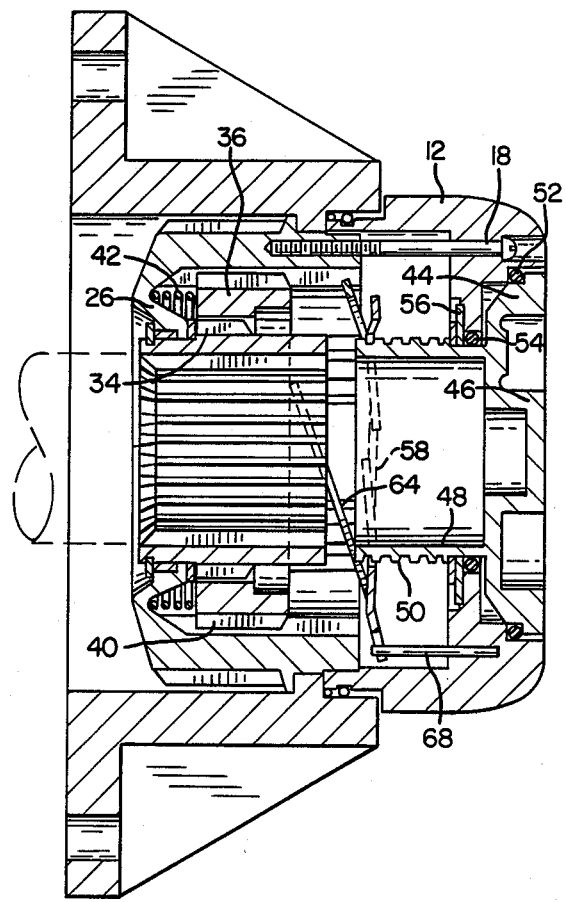
FIG. 4 is a view similar to FIG. 3 but illustrating the engaged position of the clutch ring.

Clutch ring 36 has inner splines 38 adapted to engage and disengage with splines 34 of the pinion 24, and outer splines 40 that are always engaged with splines 32 of the body member (but slideable along the splines 32). The two clutch ring positions are illustrated in FIGS. 3 and 4. In FIG. 3, the splines 38 of the clutch ring are spaced axially outward from the splines 34 of the pinion 24. Thus the pinion is free to rotate on bearings 28 and 30, inside the body portion 10 and independent of the clutch ring 36.

In FIG. 4, the clutch ring 36 is moved axially inwardly from its position of FIG. 3 and the clutch ring splines 38 are interengaged with splines 34 of the pinion. Whereas the clutch ring splines 40 continue to engage splines 32 of the body portion 10, the pinion 24, clutch ring 36, body portion 10, cap 12, casing 14 and wheel hub 16 are all interlocked. Rotatable driving of the pinion 24 will thus cause rotatable driving of the wheel hub 16.

Actuation of the clutch ring will now be explained. As can best be seen in FIGS. 3 and 4, a coil spring 42 is captured between the flange 26 of the body member 10 and the inner side of clutch ring 36. Spring 42 corresponds to the weaker spring described in the '479 Patent. It urges the clutch ring 36 to its outer or disengaged position of FIG. 3. It will be noted that in FIG. 4, spring 42 is compressed.

Provided in the end of cap 12 is a dial 44 having a finger grip portion 46. A shaft 48 is extended inwardly of the dial 44 and is provided with external screw threads 50. The dial 44, including shaft 48, is rotatably mounted in the cap 12, rotation being permitted by bearings 52, 54 and 56.

Figure 6:
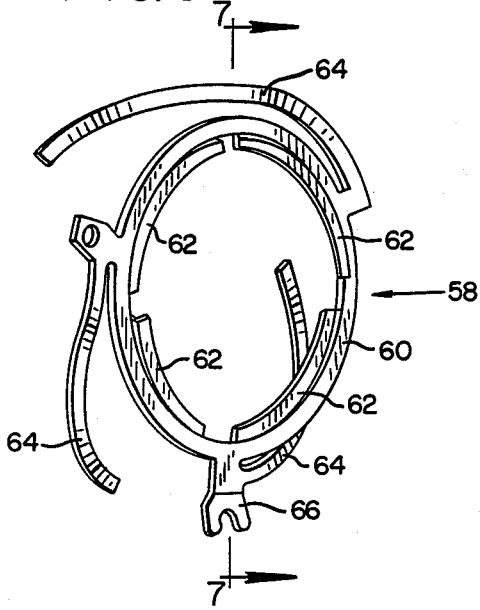
FIG. 6 is a perspective view of the integral strong spring and follower component of the actuator mechanism of FIGS. 1 through 5.
Figure 7:
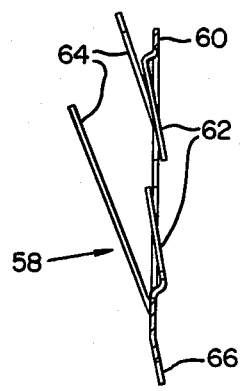
FIG. 7 is a section view taken on view lines 7—7 of FIG. 6.

A combination follower-spring 58 is illustrated in FIGS. 6 and 7. The follower-spring 58 includes a ring portion 60 having inwardly directed skewed thread engaging sections 62.

The ring portion 60 and thread engaging sections 62 provide the cam follower function of the follower-spring 58. Extended at equally spaced positions on the periphery of the ring portion 60 are spring fingers 64. An ear 66 is clevised to fit a post 68 as will be described hereafter. It will be appreciated that the follower-spring 58 is stamped from sheet metal and heat treated to render the finger 64 resilient but stiffly resilient to strongly resist compression.

Figure 5:
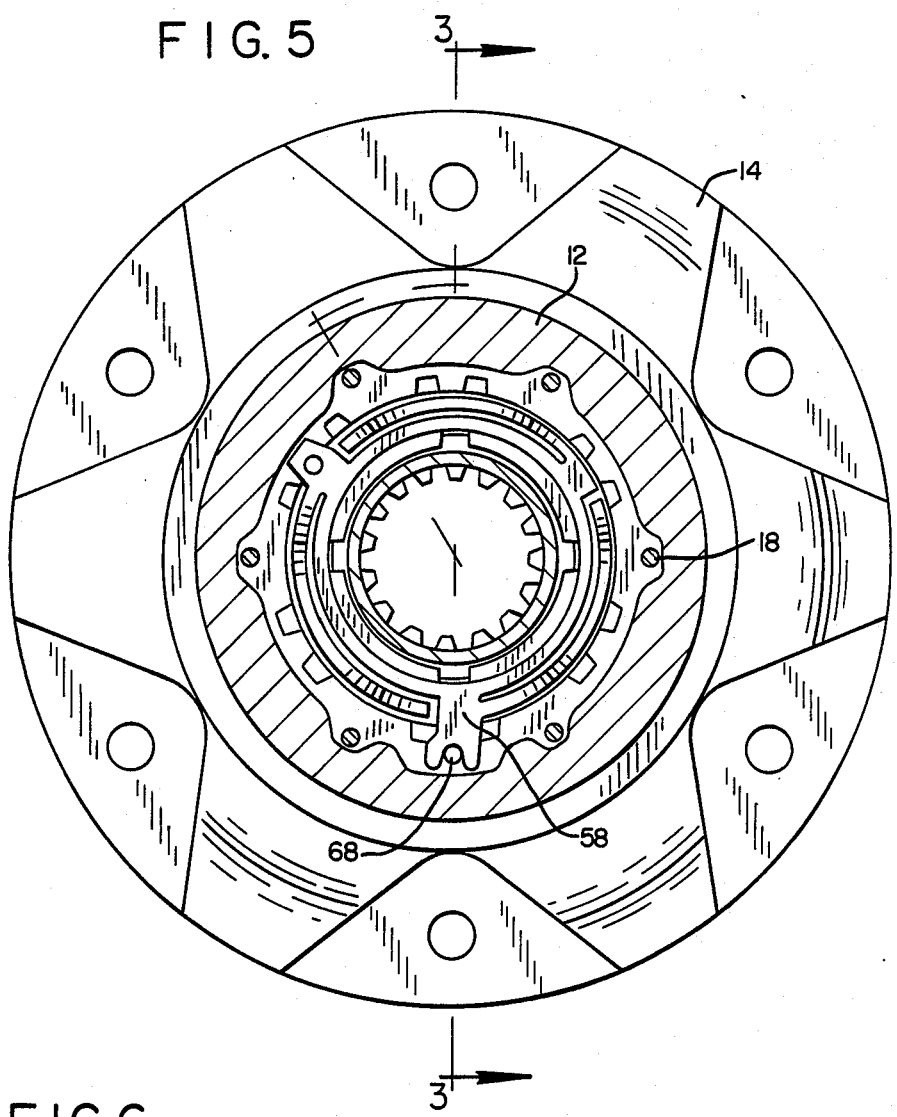
FIG. 5 is a section view as taken on view lines 5—5 of FIG. 3.

Referring now to FIGS. 3–5, the follower-spring 58 is threaded onto the shaft 48 with the clevise of ear 66 entrained on post 68. The follower-spring 58 is thus prevented from turning with turning of dial 44. As shown is FIG. 4, with dial 44 turned clockwise, follower-spring 58 is forced inwardly on the screw threads 50 of shaft 48.

The screw threads 50 engaged with sections 62 provide the camming action that controls the positioning of follower-spring 58. The fingers 64 press against the clutch ring 36. Because the stiffness of fingers 64 resist compression more than does the coil spring 42, coil spring 42 is caused to collapse as shown in FIG. 4. The clutch ring 36 thus engages with the splines 34 of pinion 24. When the pinion to wheel hub drive is to be disengaged, the dial 44 is turned in a counterclockwise motion. This turning is achieved with little effort as there is no spring compression required.

The follower-spring 58 in its entirety is repositioned to withdraw the spring engagement from the clutch ring. Although not shown, it is desirable to provide a ball-detent at each of the two positions. Such a ball-detent is disclosed in the '479 Patent.

It will be appreciated that the spring members are necessary to accomodate misalignment of the splines. Thus if such a misalignment exists at the time that the pinion and wheel drive are to be engaged, the dial 44 will simply be turned with the spring fingers 64 slightly compressed against the clutch ring. As the drive mechanism of the vehicle is thereafter engaged, the pinion 24 will be turned until the splines are aligned and the pressure applied by the fingers 64 will then simply force engagement of the clutch ring.

As previously stated, two features are particularly evident with this design. First, the number of parts are reduced by the integration of the cam follower (60, 62 of follower-spring 58) and strong spring (64). Second is the ease of manual activation provided by the release of spring biased pressure against the clutch ring. This is effected by the cam induced backing off of the strong spring.

Others skilled in the art will conceive of modifications and variations upon consideration of the above disclosures. Such modifications and variations are contemplated as defined by the Claims appended hereto.

I claim:

1. A hub mechanism for four wheel drive vehicles comprising;
    a housing having axially directed inner and outer end portions,
    a pinion rotatably supported at the inner end of the housing,
    said housing having radially inwardly directed splines surrounding the pinion, and said pinion having radially outwardly directed splines spaced from the splines of the housing, and a clutch ring axially moveable in said housing between a first position interengaged with both the pinion and housing splines, and a second position disengaged with at least one of the pinion and housing splines,
    a first spring means at the inner end of the housing between the housing and clutch ring and continuously urging the clutch ring to the second position,
    a dial rotatably mounted in the outer end portion of the housing and having a finger grip exposed for manual turning thereof, and
    a cam means and second spring means relatively stronger than the first spring means interposed between the clutch ring and dial, one of said second spring means, in its entirety and independent of spring compression and expansion, and said cam means being rotatable with the dial and the other being non rotatable and axially moveable along the splines of the housing, said cam means and said second spring means having a first relative cammed position responsive to the respective axial and rotative movements thereof for urging spring biased movement of the clutch ring to the first position and thereby compression of the first spring means, and having a second relative cammed position responsive to the respective axial and rotative movements thereof for withdrawing said spring biased urging to thereby allow the first spring means to move the clutch ring to the second position.

2. A hub mechanism as defined in claim 1 wherein the cam means comprises a shaft that extends inwardly from the dial, and screw threads formed on the shaft, and the second spring means comprises a ring surrounding the shaft with inwardly directed screw thread means engaging the screw threads of the shaft, means for preventing rotation of the ring relative to the housing to force axial movement of the ring with a turning of the shaft, and spring fingers axially extended from the ring for engaging the clutch ring whereby turning of the shaft induced by turning of the dial forces non compressive inwardly and outwardly directed movement of the spring fingers.

3. A hub mechanism as defined in claim 2 wherein the spring fingers and screw thread means are formed out of sheet metal and heat treated to the desired spring stiffness.

* * * * *